(No Model.) 4 Sheets—Sheet 1.

H. O. PEABODY.
FERTILIZER DISTRIBUTER.

No. 351,462. Patented Oct. 26, 1886.

Witnesses:
Walter E. Lombard
Alf. G. Donnell

Inventor:
Henry O. Peabody,
by N. C. Lombard
Attorney.

(No Model.) 4 Sheets—Sheet 2.

H. O. PEABODY.
FERTILIZER DISTRIBUTER.

No. 351,462. Patented Oct. 26, 1886.

Witnesses:
Walter E. Lombard,
Alex G. Donnelly

Inventor:
Henry O. Peabody.
by N. C. Lombard
Attorney.

(No Model.) 4 Sheets—Sheet 3.

H. O. PEABODY.
FERTILIZER DISTRIBUTER.

No. 351,462. Patented Oct. 26, 1886.

Witnesses:
Walter E. Lombard.
Alex G. Donnelly

Inventor:
Henry O. Peabody
by N. C. Lombard
Attorney.

(No Model.) 4 Sheets—Sheet 4.

H. O. PEABODY.
FERTILIZER DISTRIBUTER.

No. 351,462. Patented Oct. 26, 1886.

Witnesses:
Walter E. Lombard.
Alf. G. Donnelly

Inventor:
Henry O. Peabody,
by N. C. Lombard
Attorney.

UNITED STATES PATENT OFFICE.

HENRY O. PEABODY, OF BOSTON, MASSACHUSETTS.

FERTILIZER-DISTRIBUTER.

SPECIFICATION forming part of Letters Patent No. 351,462, dated October 26, 1886.

Application filed May 7, 1886. Serial No. 201,426. (No model.)

*To all whom it may concern:*

Be it known that I, HENRY O. PEABODY, of Boston, in the county of Suffolk and State of Massachusetts, have invented a new and useful Improvement in Fertilizer-Distributers, of which the following, taken in connection with the accompanying drawings, is a specification.

My invention relates to that class of fertilizer-distributers in which the material to be distributed is placed in a hollow revolving drum or cylinder and is discharged therefrom through a series of openings in the periphery of said cylinder, and particularly to the devices for measuring and discharging the material, and is an improvement upon the inventions described in Letters Patent Nos. 309,404 and 320,279, granted to me December 10, 1884, and June 16, 1885, respectively; and it consists in certain novel features of construction, arrangement, and combination of parts, which will be readily understood by reference to the description of the drawings, and to the claims to be hereinafter given.

Figure 1:
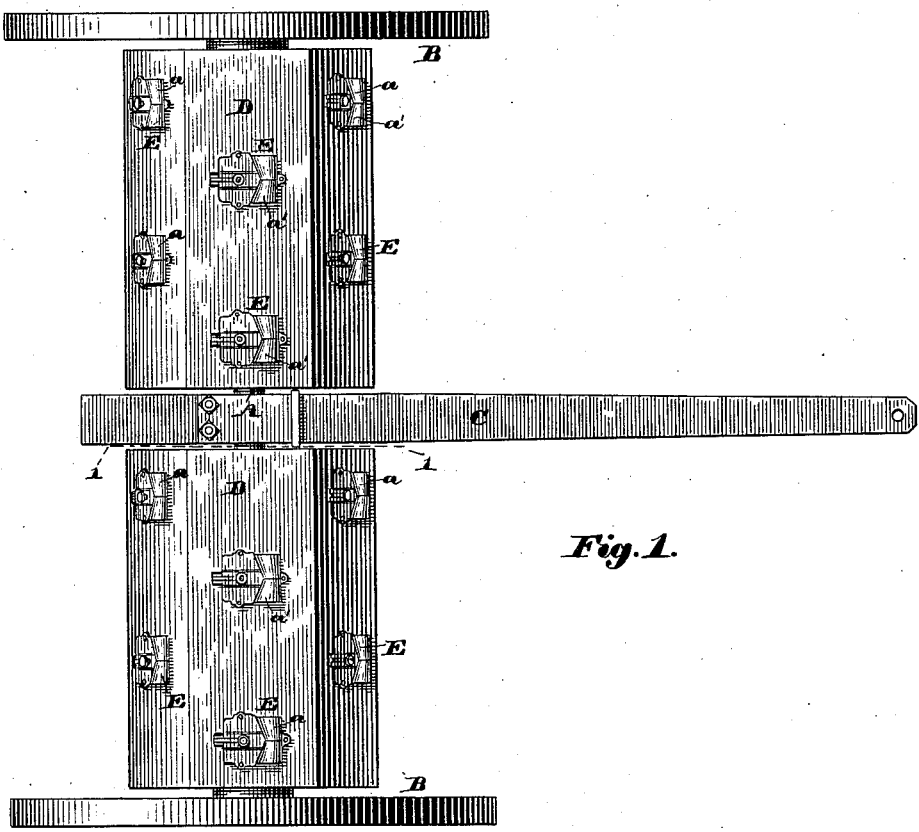
Figure 2:
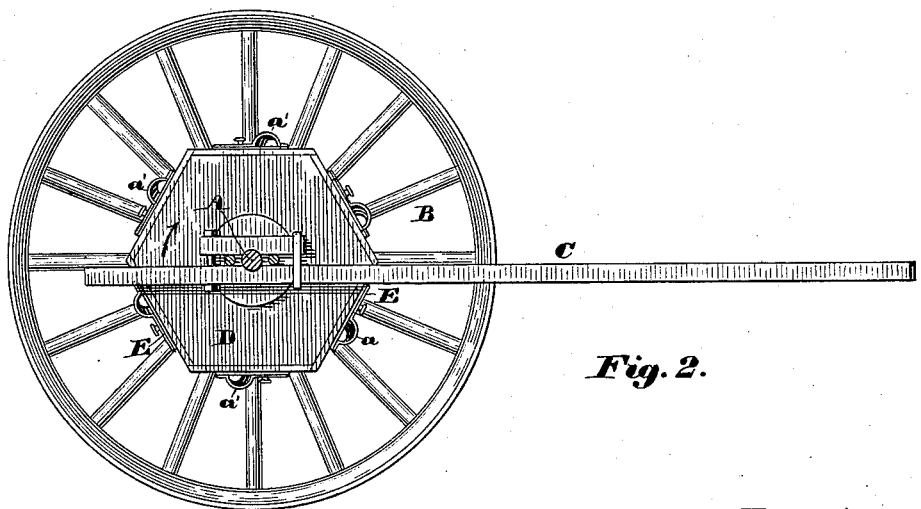
Figure 3:
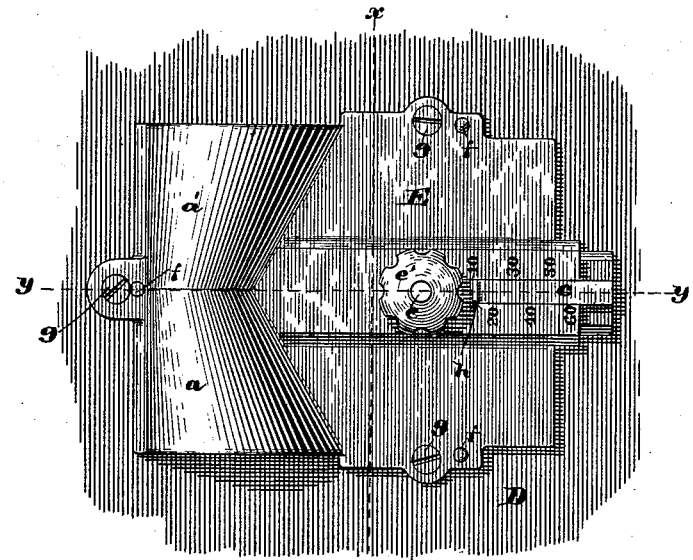
Figure 4:
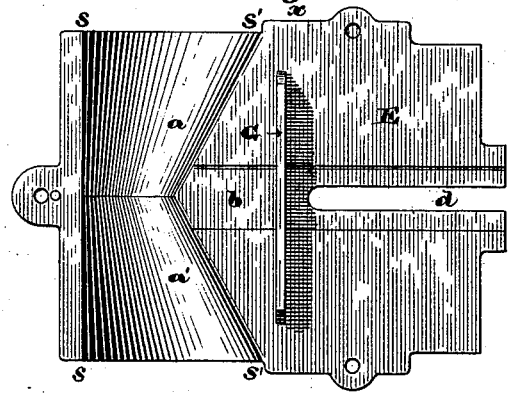
Figure 5:
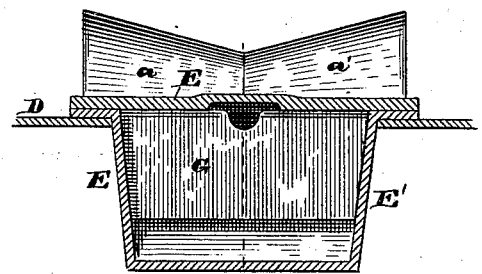
Figures 6, 7:
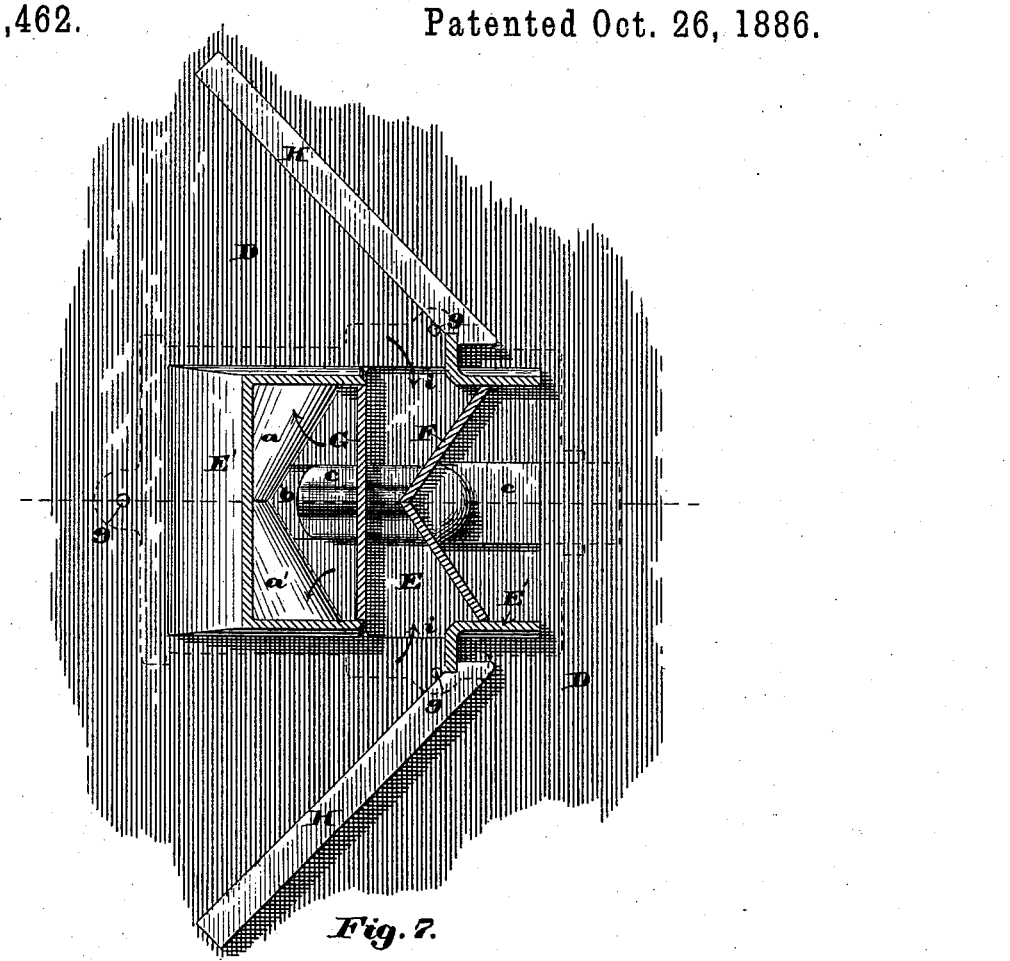
Figure 10:
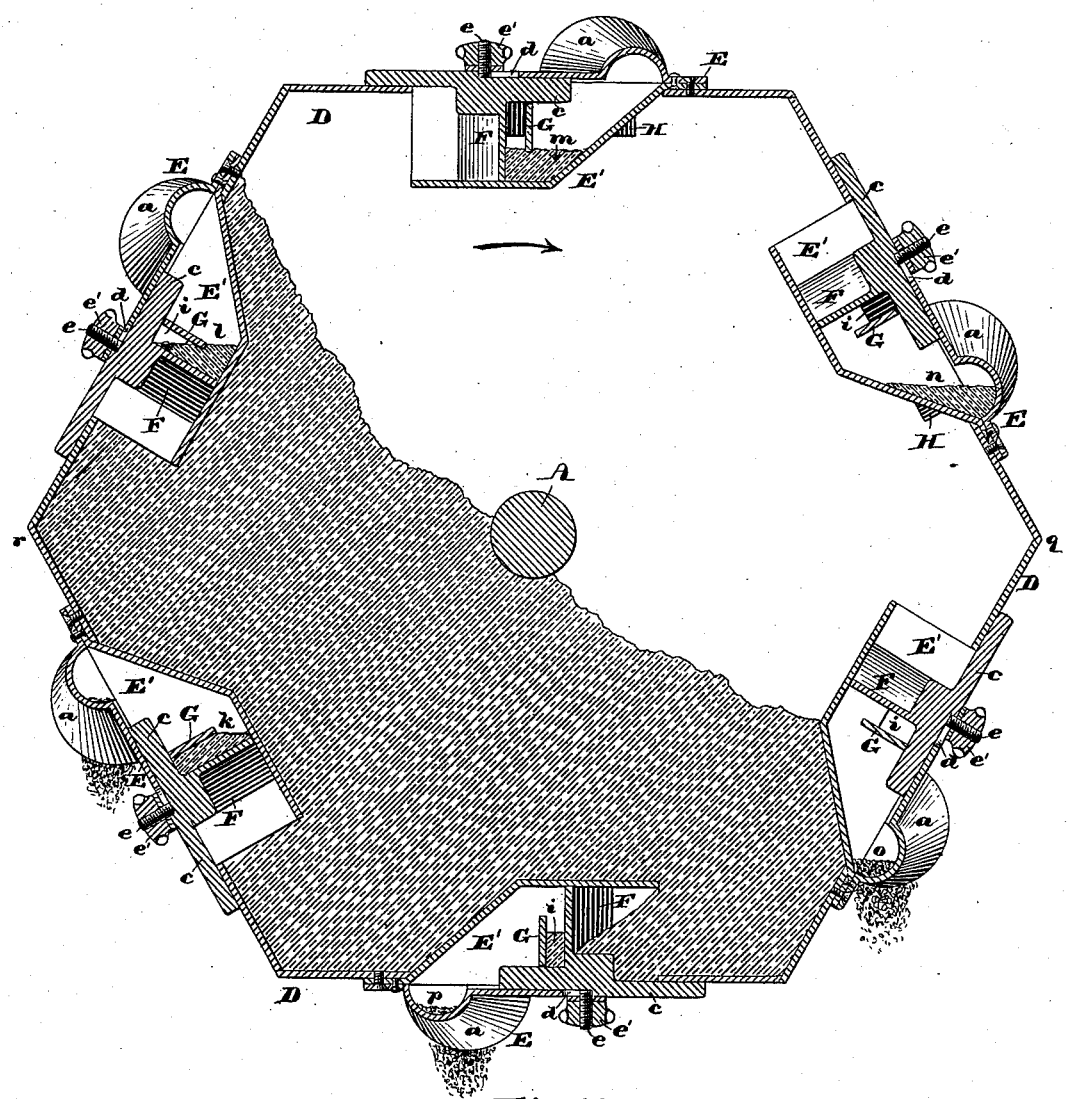
Figure 8:
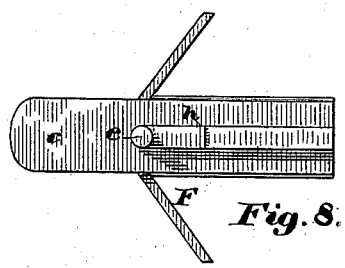
Figure 9:
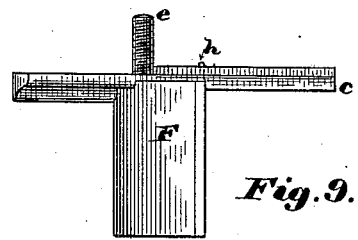

Figure 1 of the drawings is a plan of a fertilizer-distributer with my improvement applied thereto. Fig. 2 is a vertical section on line 1 1 on Fig. 1. Fig. 3 is a plan of one of the devices for measuring and discharging the fertilizing material, with a small portion of one of the sides of the hexagonal drum to which it is attached. Fig. 4 is an inverted plan of the outer plate of said measuring and discharging device. Fig. 5 is a section on line $xx$ on Fig. 3, looking toward the flaring discharge-tubes.
Fig. 6 is a section on line $yy$ on Fig. 5. Fig. 7 is a section on line $zz$ on Fig. 6. Figs. 8 and 9 are respectively a plan and a side elevation of the adjustable plunger, and Fig. 10 is a transverse section through the drum and showing six buckets in section.

In the drawings, A is the axle; B, the wheels; C, the pole or perch; and D D two hexagonal hollow drums to receive the material to be distributed, all arranged, connected together, and operated substantially as shown and described in Letters Patent No. 320,275, before referred to.

The hexagonal drums D D are each provided with a series of receiving and discharging chambers, each composed of the outer plate, E, having formed near one end thereof a bend in the form of two frusto-conical semi-tubes, $a$ and $a'$, with their small ends joined, the bucket-like casting E' secured to said plate E and fitted to and projecting through an opening cut through the shell of the drum D, the adjustable double-inclined or V-shaped plunger F and the inwardly-projecting ledge G, cast upon the inner face of the plate E, and having a width equal to about two-thirds of the depth of the casting E, as shown in Fig. 6.

The plate E has formed in its inner face the shallow groove $b$, to receive and guide the shank or stem $c$ of the plunger F, and with the slot $d$, to receive the shank of the screw $e$, firmly secured in the plunger F preferably by casting the metal around the head of the screw, said plunger being clamped in any desired position by means of said screw and the thumb-nut $e'$, as shown in Figs. 3 and 6. The stem $c$ of the plunger F extends inward beyond the apex of the V-shaped face of said plunger and through an opening in the plate or ledge G, as shown in Figs. 5, 6, and 7.

The plate E and the bucket E' are secured together by the rivets $fff$, and the whole is secured to the drum D by the screws $ggg$, all as shown in Figs. 3 and 6.

The stem of the plunger F has formed upon its upper side a rib, which fits into the slot $d$ in the plate E, and has formed upon its upper side a transverse line or index-mark $h$, which, in connection with the figures formed upon the plate E, on each side of the slot $d$, serves as a means of determining the proper position of the plunger to deliver a given quantity of material.

The casting E' has formed in opposite sides thereof, and just inside of the peripheral wall or casing of the drum D, two rectangular openings, $ii$, through which the fertilizing material enters the bucket between the inclined faces of the plunger F and the ledge G, it being directed thereto by the oblique ledges H H, secured to the inner surface of the drum-casing, as shown in Fig. 7.

The measuring, receiving, and discharging buckets are arranged in circumferential rows around the drum, there being just half as many buckets in each row as there are flat sides to said drum, and the buckets in one row alternating with the spaces in the next row, as shown in Fig. 1.

The bucket E' has its closed end inclined at an angle of about forty-five degrees to the inner face of that side of the drum-casing to which it is secured, as shown in Fig. 6.

The operation of my invention is as follows: A quantity of fertilizing material—such as ground bone—having been placed in each of the drums D D, and said drums being connected to the wheels B B, so as to revolve therewith if the machine be drawn along the ground so as to revolve the wheels and drums, the fertilizer will be discharged from the larger end of the conical semi-tubes $a$ and $a'$, at each side of each plate E, in a steady stream and be deposited upon the ground in parallel rows, the distance apart of which will be determined by the width of the plate E, or the combined length of the conical semi-tubes $a$ and $a'$ and the longitudinal distance apart of the circumferential rows of buckets. The drums D D revolve in the direction indicated by the arrow on Figs. 2 and 10. As the fertilizer naturally falls to the lower side of the drums, the buckets which are at or near the bottom are completely buried by the fertilizer, which completely fills the angle between the inclined ledges H H and the sides of the buckets E' and partially fills the space between the inclined faces of the plunger F and the ledge G. As the drum revolves in the direction indicated by the arrows on Figs. 2 and 10 and the bucket assumes the position indicated at the lower left-hand portion of Fig. 10, the fertilizer that lies between the inclined ledges H H and the sides of the bucket slides down said inclines and through the openings $i\ i$, to increase the quantity of fertilizer in the chamber between the inclined surfaces of the plunger and the ledge G and nearly fills said space, as indicated by $k$. When the bucket has assumed the position shown at the upper left-hand portion of Fig. 10, any fertilizer carried upward by the inclined ledges and that has not found its way into the bucket will fall therefrom to the bottom of the drum, and the material within the bucket will have assumed the position indicated by $l$, and in like manner as the drum revolves and the bucket assumes the positions indicated at the top, upper right-hand, lower right-hand, and bottom portions of Fig. 10, the material contained in the bucket assumes successively the positions indicated by $m, n, o,$ and $p$, said material beginning to be discharged from the semi-tubular passages when the bucket reaches the point $q$ on Fig. 10, and continues to be discharged until the bucket reaches the point $r$ in the revolution. The material first fills that portion of the space between the plunger F and the ledge or partition G contiguous to the casing of the drum, and extending inward as far as the inner sides of the openings $i\ i$. Then as the drum revolves it falls to the inner side of said space, then slides along the bottom or inner wall of the bucket beneath the partition G toward the inclined end wall of the bucket, along said inclined wall to the semicircular flaring discharge-tubes, where the mass divides, and by virtue of the varying angle of incline of the walls of said tubes it will be delivered from the larger ends of said tubes in a continual stream during the passage of the bucket from the point $q$ to $r$ on Fig. 10, as before described. The amount of material that will be delivered from a single bucket may be varied at pleasure by adjusting the plunger F to a greater or less distance from the ledge G, which may be done by simply slackening the nut $e'$, moving the plunger in or out till the index-mark $h$ coincides with the number standing for the amount required to be discharged.

In some cases it may be desirable to have but one inlet-passage to the bucket and but one frusto-conical semi-tubular discharge-passage—as, for instance, when it is desired to place the bucket in close proximity to the end of the drum, in which case the small end of the flaring discharge-passage would be closed and the adjustable plunger would have but one inclined inner face, all of which may be done without departing from the principles of my invention.

It will be observed that I use no valves or gates to close the passages through which the fertilizer is discharged; but, on the contrary, a free passage from the interior of the drum to the exterior thereof is always open, while at the same time, by virtue of the peculiar nature of the material to be distributed and the form of the passages from the interior of the drum to its exterior, no discharge of the fertilizer will take place so long as the drum is not revolved; but when the drum is connected to the wheel so as to revolve therewith, as the machine is moved along the ground the fertilizer will be discharged from each discharge-orifice during about one-half of each revolution, and with such near approach to an even and regular discharge that with three of these measuring-receivers and discharging devices in each circumferential row the fertilizer will be evenly distributed in a continuous row along the ground for each discharge.

It will be seen by reference to Figs. 3 and 4 that the two frusto-conical semi-tubular passages $a$ and $a'$ are so arranged relative to each other that one side of each is parallel to the axis of the drum, and that said sides are in line with each other, while all other parts of the inner surfaces of said passages are inclined from their junction to their larger or discharge ends to a constantly-increasing angle to the axis of the drum from the straight or parallel side $s$ around to the opposite side at $s'$.

What I claim as new, and desire to secure by Letters Patent of the United States, is—

1. In combination with a hollow revoluble fertilizer-holding drum, a device for receiving, measuring, and discharging the fertilizer, consisting of a measuring-receptacle set in an opening in the periphery of said drum and projecting inwardly therefrom, and provided with inlet-openings in opposite sides thereof contiguous to the inner surface of the peripheral casing of said drum, and with a ledge projecting inward from said casing a distance equal to about two-thirds of the radial depth of the measuring-receptacle, and two discharge-passages upon the exterior of said drum in the form of two frusto-conical semi-tubes with their smaller ends abutting each other and their inner sides communicating with the interior of the measuring-receptacle.

2. In combination with a revoluble hollow fertilizer-holding drum, the bucket E', having one end closed and inclined to the face of the drum to which it is secured, and the other end open, and having the two side openings, $i\ i$, the adjustable plunger F, the ledge G, and the frusto-conical semi-tubular passages $a$ and $a'$, all constructed, arranged, and adapted to operate substantially as and for the purposes described.

3. The combination of a revoluble hollow fertilizer-holding drum, the bucket E, provided with inlet-openings in opposite sides thereof contiguous to the inner surface of the peripheral casing of said drum, the ledge G, projecting into said bucket, as shown, the frusto-conical semi-tubular discharge-passages $a$ and $a'$, and the concentrating ledges H H, secured to the inner surface of the drum, substantially as described.

4. The combination, in a fertilizer-distributer, of a hollow revoluble fertilizer-holding drum, a bucket or receiver partially divided near the middle of its length by an inwardly-projecting ledge or partition into two compartments, an inlet-orifice opening into said bucket or receiver at one side of said partition and contiguous to the inner surface of the casing of said drum, a passage leading from said receiver through said casing to the exterior thereof upon the other side of said partition, and a frusto-conical semi-tubular discharge-passage upon the exterior of said drum and covering said passage from the receiver through the casing of the drum.

5. In combination with a hollow revoluble fertilizer-holding drum, a bucket or receiver within said drum, constructed to receive and measure a quantity of the material to be discharged, and an opening through the peripheral casing of said drum, communicating with the interior of said bucket or receiver, and a covering for the discharge-opening through the casing of said drum in the form of a frusto-conical semi-tube, arranged with one of its sides parallel to the axis of revolution of said drum.

6. A hollow revoluble fertilizer-holding drum provided with a series of tortuous and valveless passages leading from the interior to the exterior thereof, with their discharge-openings in planes at right angles to the axis of said drum, in combination with a series of inclined ledges secured to and projecting inward from the inner surface of the peripheral casing of said drum in positions to guide the material contained in said drum into said tortuous passages at certain points in the revolution of the drum.

In testimony whereof I have signed my name to this specification, in the presence of two subscribing witnesses, on this 5th day of May, A. D. 1886.

HENRY O. PEABODY.

Witnesses:
N. C. LOMBARD,
WALTER E. LOMBARD.